(12) United States Patent
Mishra

(10) Patent No.: US 11,652,803 B2
(45) Date of Patent: May 16, 2023

(54) SYSTEM, METHOD AND COMPUTER-ACCESSIBLE MEDIUM FOR SUPPORTING AT LEAST ONE CYBER-PHYSICAL SIGNALING GAME

(71) Applicant: NEW YORK UNIVERSITY, New York, NY (US)

(72) Inventor: Bhubaneswar Mishra, Great Neck, NY (US)

(73) Assignee: NEW YORK UNIVERSITY, New York, NY (US)

(*) Notice: Subject to any disclaimer, the term of this patent is extended or adjusted under 35 U.S.C. 154(b) by 442 days.

(21) Appl. No.: 16/880,919

(22) Filed: May 21, 2020

(65) Prior Publication Data
US 2020/0374270 A1    Nov. 26, 2020

Related U.S. Application Data

(60) Provisional application No. 62/850,751, filed on May 21, 2019.

(51) Int. Cl.
*H04L 29/06* (2006.01)
*H04L 9/40* (2022.01)
(Continued)

(52) U.S. Cl.
CPC .......... *H04L 63/0428* (2013.01); *A63F 13/71* (2014.09); *G06Q 10/10* (2013.01); *G06Q 20/085* (2013.01); *G06Q 30/0185* (2013.01); *G06Q 40/025* (2013.01); *G06Q 50/265* (2013.01); *H04L 9/14* (2013.01); *H04L 9/30* (2013.01);
(Continued)

(58) Field of Classification Search
None
See application file for complete search history.

(56) References Cited

U.S. PATENT DOCUMENTS

| 2002/0023215 A1* | 2/2002 | Wang | H04L 63/0853 |
| | | | 713/184 |
| 2003/0171975 A1* | 9/2003 | Kirshenbaum | G06Q 30/0204 |
| | | | 705/7.33 |

(Continued)

OTHER PUBLICATIONS

Black, Antony, The "Axial Period:" What Was It and What Does It Signify?, 70(12), 23-39, The Review of Politics, (2008).
(Continued)

*Primary Examiner* — William J. Goodchild
(74) *Attorney, Agent, or Firm* — Hunton Andrews Kurth LLP

(57) ABSTRACT

Exemplary system, method, and computer-accessible medium for transmitting or generating an encrypted message(s) to or for a receiver(s) from a sender(s), can be provided, which can include, for example, generating an electronic public key(s) and an electronic private key(s) for the sender(s), generating first information based on (i) data of the sender(s), (ii) a state(s) of the sender(s), and/or (iii) a type of the sender(s), electronically selecting an electronic message signal(s) and a time stamp(s) based on the first information, generating a message(s) based on the electronic message signal(s) and the time stamp(s), generating the encrypted message(s) by encrypting the message(s) using the electronic private key(s), and transmitting the encrypted message(s) to the receiver(s).

19 Claims, 8 Drawing Sheets

(51) Int. Cl.
  *H04L 9/14* (2006.01)
  *H04L 9/30* (2006.01)
  *G06Q 50/26* (2012.01)
  *G06Q 10/10* (2023.01)
  *G06Q 30/018* (2023.01)
  *G06Q 20/08* (2012.01)
  *A63F 13/71* (2014.01)
  *G06Q 40/02* (2023.01)
  *G06F 21/45* (2013.01)

(52) U.S. Cl.
  CPC ...... *G06F 21/45* (2013.01); *G06F 2221/2109* (2013.01); *G06Q 2220/00* (2013.01)

(56) References Cited

U.S. PATENT DOCUMENTS

| | | | | |
|---|---|---|---|---|
| 2005/0117745 | A1* | 6/2005 | Lee | H04L 9/304 380/30 |
| 2007/0061706 | A1* | 3/2007 | Cupala | G06F 9/4492 715/244 |
| 2012/0185398 | A1* | 7/2012 | Weis | G06Q 20/4015 705/16 |
| 2015/0019440 | A1* | 1/2015 | Yang | H04L 9/3226 705/65 |
| 2016/0224950 | A1* | 8/2016 | Attar | G06Q 20/027 |
| 2017/0011460 | A1* | 1/2017 | Molinari | G06Q 40/06 |
| 2018/0061237 | A1* | 3/2018 | Erickson | G08G 1/0112 |
| 2018/0216946 | A1* | 8/2018 | Gueye | G01C 21/3617 |
| 2019/0156938 | A1* | 5/2019 | Brunner | H04L 9/0643 |

OTHER PUBLICATIONS

Kleinberg, Samantha et al., The Temporal Logic of Causal Structures, UAI 2009, Proceedings of the Twenty-Fifth Conference on Uncertainty in Artificial Intelligence, Montreal, QC, Canada, Jun. 18-21, 2009, 303-312, AUAI Press, (2009).

Gao, Gelin et al., Causal Data Science for Financial Stress Testing, J. Comput. Science, 26, 294-304, (2018).

Casey, William et al., Deception, Identity, and Security: the Game Theory of Sybil Attacks, Commun. ACM, 62(1), 85-93, (2019).

Bonchi, Francesco et al., Probabilistic Causal Analysis of Social Influence, Proceedings of the 27th ACM International Conference on Information and Knowledge Management, CIKM 2018, Torino, Italy, Oct. 22-26, 2018, 1003-1012, (2018).

* cited by examiner

SYSTEM, METHOD AND COMPUTER-ACCESSIBLE MEDIUM FOR SUPPORTING AT LEAST ONE CYBER-PHYSICAL SIGNALING GAME

CROSS-REFERENCE TO RELATED APPLICATION(S)

This application relates to U.S. Patent Application No. 62/850,751, filed on May 21, 2019, the entire disclosure of which is incorporated herein by reference.

FIELD OF THE DISCLOSURE

The present disclosure relates generally to signaling games, and more specifically, to exemplary embodiments of an exemplary system, method, and computer-accessible medium for supporting at least one cyber-physical signaling game.

BACKGROUND INFORMATION

A smart contract is a computer protocol that can digitally facilitate, verify, or enforce the negotiation or performance of a contract. Smart contracts facilitated a performance of credible transactions without third parties. These transactions are trackable and irreversible. Various contractual clauses can be made partially or fully self-executing, self-enforcing, or both. A smart contract can provide security that can be superior to traditional contract law, and may reduce other transaction costs associated with contracting. For example, various cryptocurrencies have implemented types of smart contracts. However, because various smart contracts can be executed without a physical meeting, the potential for a fraud or misrepresentation is high.

Thus, it may be beneficial to provide an exemplary system, method, and computer-accessible medium for supporting at least one cyber-physical signaling game, which can overcome/address fraud and/or misrepresentation in smart contracts.

SUMMARY OF EXEMPLARY EMBODIMENTS

To that end, exemplary system, method, and computer-accessible medium for transmitting or generating an encrypted message(s) to or for a receiver(s) from a sender(s), can be provided, which can include, for example, generating an electronic public key(s) and an electronic private key(s) for the sender(s), generating first information based on (i) data of the sender(s), (ii) a state(s) of the sender(s), or (iii) a type of the sender(s), electronically selecting an electronic message signal(s) and a time stamp(s) based on the first information, generating a message(s) based on the electronic message signal(s) and the time stamp(s), generating the encrypted message(s) by encrypting the message(s) using the electronic private key(s), and transmitting the encrypted message(s) to the receiver(s).

In various exemplary embodiments of the present disclosure, the electronic public key(s) and the electronic private key(s) can be generated based a genome(s) associated with the sender(s). The electronic public key(s) and the electronic private key(s) can be generated using a deterministic procedure, which can be used to select genomic polymorphisms, associated with the sender(s), at certain chromosomal locations, and combine the genomic polymorphisms with a particular number of paddings bits. A plurality of binary coefficients can be generated for the genome(s) by converting a single-nucleotide polymorphism(s) into a binary number, selecting a subset of the binary coefficients, and hashing the subset of the binary coefficients. A binary vector having a length of about 100 or about 200 can be generated by hashing the subset of the binary coefficients. The electronic private key(s) can be disguised within the electronic public key(s) using a McEliece cryptosystem.

In certain exemplary embodiments of the present disclosure, the message(s) can include the electronic public key(s), (ii) a further electronic public key(s) associated with the receiver(s), or (iii) a hash of the message signal(s) concatenated with private data and the time stamp(s). The type can include (i) a digital wallet, (ii) a private-key, (iii) a pseudonymity, (iv) a reputation, (v) a criminal record, (vi) a net-worth, (vii) a credit-score, or (viii) a marital-status. A confirmation indication that the receiver(s) has checked the encrypted message(s) for a set of local properties and global properties of the sender(s) or the receiver(s) can be received. The local properties can include, e.g., (i) a digital message digitally signed using a private key, (ii) an amount of a net worth that exceeds a first threshold, and/or (iii) an amount of a reputation that exceeds a second threshold, and the global properties can include, e.g., (i) at least one smart contract, (ii) a reputation score that has remained above a third threshold for a second amount of time, and/or (iv) a credit-worthiness score that has remained above a fourth threshold for a second period of time.

In various exemplary embodiments of the present disclosure, the local properties and the global properties can be time dependent. The local properties and the global properties can be time independent. The encrypted message can be electronically recorded in an electronic ledger(s), which can be a visible hyper-ledger or a Kripke ledger. A plurality of utilities associated with the sender(s) can be received. The utilities can include, e.g., (i) a trust between the sender(s) and the receiver(s), (ii) a reputation associated with the sender(s) or the receiver(s), (iii) a monetary payment, (iv) a credit-score, and/or (v) a reputation score.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
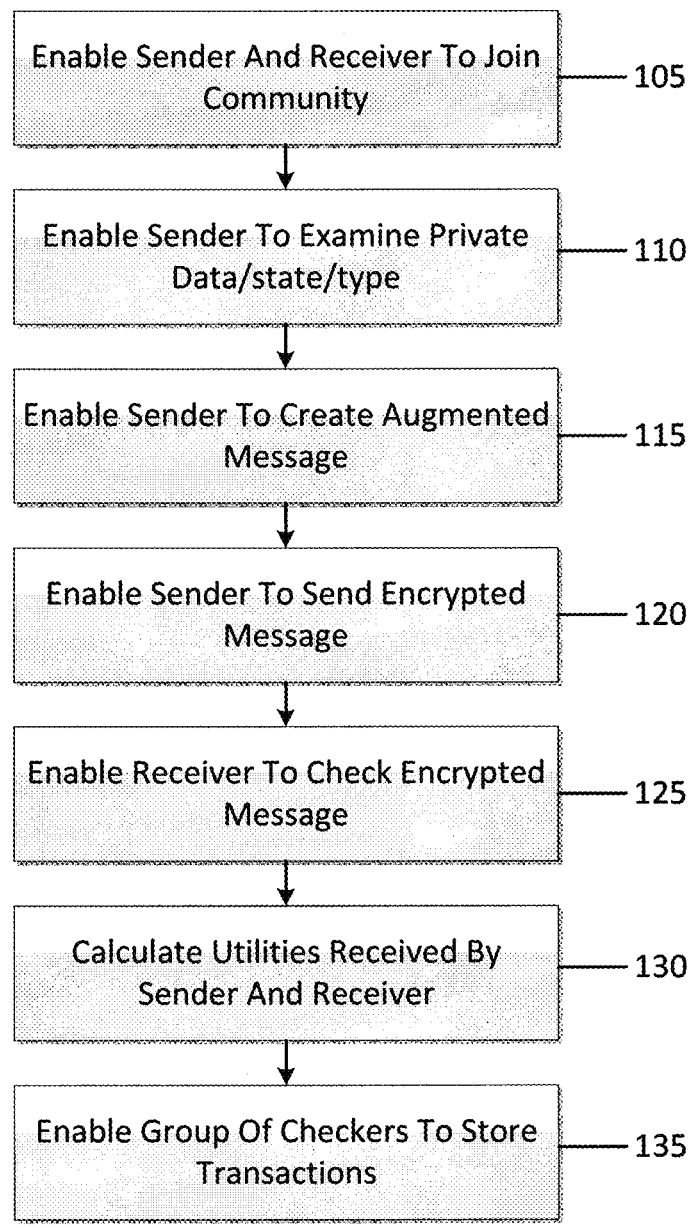
FIG. 1 is an exemplary flow diagram of an exemplary method for supporting a cyber-physical signaling game according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

FIG. 1 shows an exemplary flow diagram of an exemplary method 100 for supporting a cyber-physical signaling game according to an exemplary embodiment of the present disclosure. For example, at procedure 105, a sender and a receiver can be facilitated to join the community after establishing their public/verifying and private/signing asymmetric public-keys and publishing the public/verifying keys. At procedure 110, the sender can be enabled to examine his private data/state/type and select a message signal along with a time stamp. Exemplary private data/states can include, e.g., encryption keys associated with the sender, as well as actions, rate-distortion based utilities, and encrypted messages. Examples of types can include a sender's wallet, a private-key, pseudonymity, reputation, criminal record, net-worth, credit-score, marital-status, etc. The message signal can be, or can include, a signed-message for a payment to receiver.

At procedure 115, the sender can be facilitated to create an augmented message including his own public-key, receiver's public-key, message signal, hash of message signal concatenated with private data and time-stamp, further encrypted by sender's private/signing key. At procedure 120, the sender can be facilitated to send the encrypted message to the receiver. At procedure 125, the receiver can be enabled to check the message for a suitable set of local and global properties and carry out a suitable action by the receiver based on the message and the result of the checking procedure. Actions can include, e.g., updating wallets associated with the receiver. An indication can be provided to the sender that the receiver checked the message. At procedure 130, the utilities received by the sender as well as by the receiver can be calculated. Utilities can include, e.g., a trust between a sender and a receiver and/or a reputation associated with each of the sender or the receiver. Additional utilities can include, for example, a monetary payment, a credit-score, or a reputation score. Exemplary utilities can be based on utility functions that can combine information rates with distortion. At procedure 135, a group of checkers can be effectuated to store the transactions, checking results and utilities information in a publicly visible hyper-ledger.

The group of checkers can be utilized to perform an exemplary task to be permitted to modify the hyper-ledger. The group of checkers can receive a transaction fee. A checker can act as an intermediary for only a subset of senders and receivers; however, a checker may not reveal the membership information about the selected subset. A checker can check the local and global properties for all senders and receivers or only the subset it can be designated for. The local property can be the identity of the sender, which can be verified using a public key associated with the sender. The local property can also include a digital message—digitally signed by a private key, net-worth that exceeds a threshold, or a reputation that exceeds a threshold. A global property can include consistent usage of multiple identities by the sender over time or a smart contract. The global property can also include a reputation and/or a credit-worthiness that have each remained above a threshold for a sufficiently long period of time. The local property may not be time dependent, and can be checkable by the information in the transaction. The local property can be expressible as a Boolean formula, an arithmetic formula, or a combination thereof.

In some exemplary embodiments of the present disclosure, the global property can be time dependent and can be checkable or verifiable by the information of transactions in the hyper-ledger. The global property can be expressed as a propositional modal/temporal formula and can be bounded to a time-interval of a fixed size. The global temporal property can be checkable by symbolic model checking as translated into a satisfiability problem. The exemplary system, method, and computer-accessible medium, according to an exemplary embodiment of the present disclosure, can verify properties by creating suitable Boolean or arithmetic circuits and their correctness established by zk-SNARKs, without revealing any member-specific information. A list of a plurality of further recommender agents and a plurality of further verification agents can be generated, as well as a rank for each further recommendation agent. There can be a plurality of modules, where the information in each of the modules can be different from the information in the other modules. Exemplary information can include private information about a user.

Figure 2:
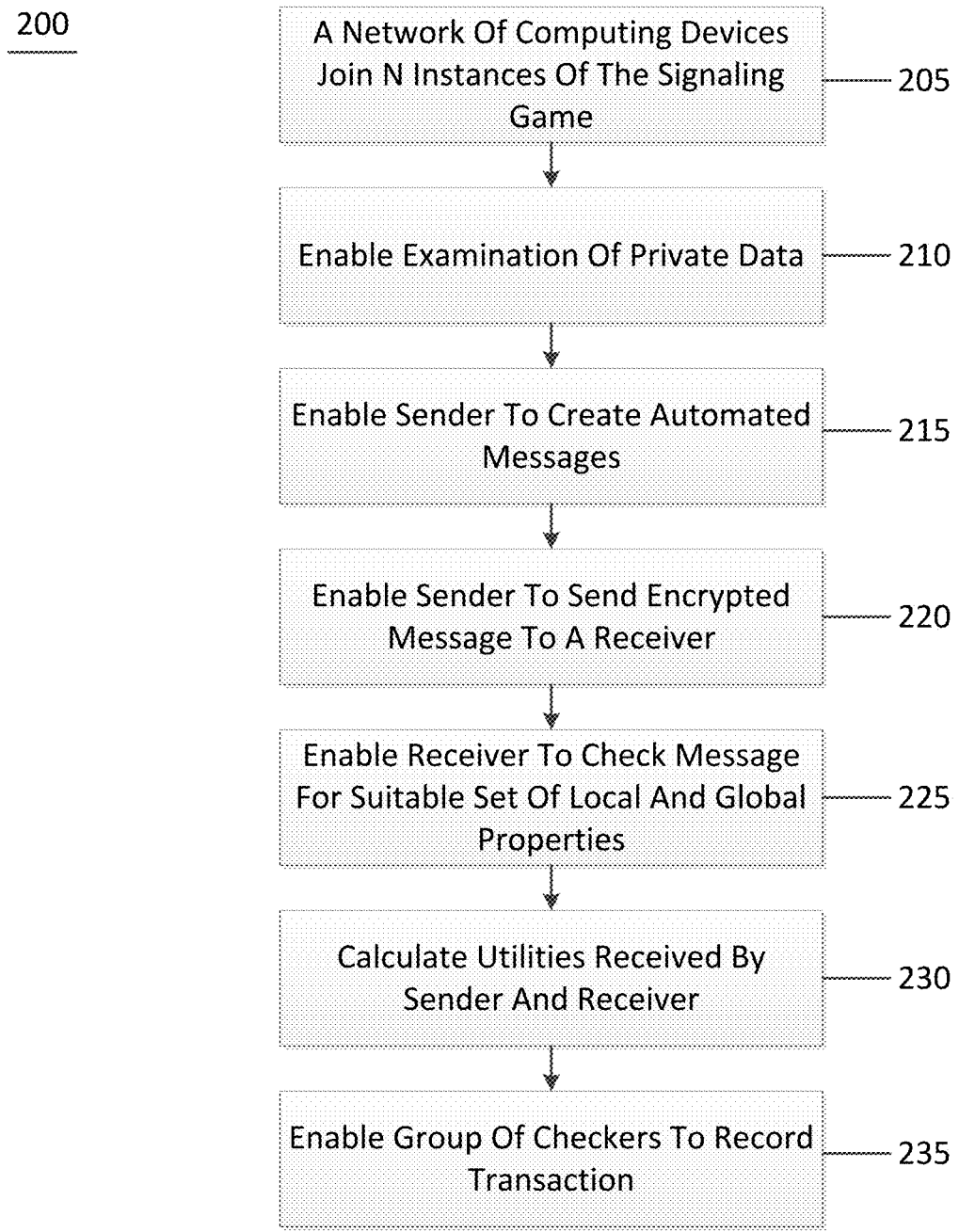
FIG. 2 is an exemplary flow diagram of an exemplary method for supporting a cyber-physical information-asymmetric signaling game according to an exemplary embodiment of the present disclosure.

FIG. 2 shows an exemplary flow diagram of an exemplary method 200 for supporting a cyber-physical information-asymmetric signaling game ("SG") according to an exemplary embodiment of the present disclosure. For example, at procedure 205, in an exemplary embodiment of SG, involving a cyber-physical network of computing devices (e.g., Internet, clouds, servers, smart-phones, etc.), with each such device, associated to an agent (e.g., a human or a community of humans), two agents, a sender and a receiver can be enabled to join n instance of the signaling game after establishing their identities, and publishing their identities. In an exemplary embodiment, the identities can be encoded by a pair of public/verifying and private/signing asymmetric public/private keys and publishing just the public/verifying keys, while keeping the private/signing key secret in a secure storage medium.

In such an exemplary embodiment, the sender and the receiver can compute their identities using their individual genome DNA sequences, when each one can be an individual human; suitable generalization can be created for agents, representing communities of humans acting collectively as a single sender or receiver agent. For an individual human, their genome can be sequenced noninvasively using saliva, peripheral blood, hair follicles, etc., using an appropriate DNA sequencing or mapping platform. In a typical human genome, it can be expected that the number of polymorphisms can be more than several millions, for instance, the occurrences of Single Nucleotide Polymorphisms ("SNPs"). Two individuals (e.g., not identical twins or clones) can differ in their genomes in millions of such locations. A deterministic procedure can be used in creating binary coefficients by first converting the SNP's to binary numbers (e.g., 0, for ancestral SNP and 1, for recent SNPs), selecting a subset and hashing them to a range of {0, 1} to create a binary vector of length of about 100 (e.g., plus or minus about 10%). The deterministic procedure can include, for example, any suitable procedure that can use pseudo-random numbers created from a fixed seed that can depend on the markers. The markers may or may not change over time.

It can be further padded with another random binary vector to create a long binary vector of length about 200 (e.g., plus or minus about 10%), which can be unique to the individual, and can be efficiently and verifiably computable for an individual and the basis for the individual identity. A univariate monic polynomial with the coefficients from this binary vector can be an irreducible polynomial, and can be tested for irreducibility in a computationally efficient manner. If the irreducibility test fails, then multiple trials can succeed very quickly to generate a genome-associated irreducible univariate polynomial. Equipped with one such irreducible polynomial, and using an exemplary McEliece Procedure, the individual can generate public/verifying and private/signing keys and can publish and hide the public and private keys, respectively.

The exemplary McEliece cryptosystem can utilize coding to disguise the secret private key into the public one An exemplary embodiment of the present disclosure that uses an exemplary McEliece cryptosystem can have other advantages as its fast encryption and decryption procedures can utilize a significantly lower number of operations with respect to alternative solutions (e.g., like RSA). Many newer improvements, as known to persons having ordinary skills in the art, can be incorporated into the exemplary embodiments. It can also resist attacks based on quantum computers, but if the advances in quantum computer weaken the exemplary embodiment, other approaches based on post-quantum cryptosystems can be used. For example, the exemplary embodiment of the system, method, and computer-accessible medium can also resist identity theft, as in the event of an identity stolen, the affected individual can prove their ownership of the identity by submitting their DNA, public key and the irreducible polynomial used in generating the public/private key pairs. In event of such an identity theft, the corrupted identity can be abandoned with proper substitutions of public/private keys and recording the event in a non-tamperable (e.g., distributed) ledger.

As in the classical description of a signaling game, it can be assumed that the sender can be informed and knows their own information (e.g., usually called, their TYPE). It can also be assumed that the receiver can be uninformed, but capable of carrying out an action (ACTION) based on a signal (SIGNAL) received from the sender. While the sender's SIGNAL can be related to their TYPE, the sender can be deceptive and can induce the receiver to carry out a desired ACTION, even when the Sender does not possess the correct TYPE. In an exemplary embodiment, as shown at procedure 210, the sender can be enabled to examine his private data/state/type and select a message signal along with a time stamp. In contrast to the classical signaling game (e.g., in a non-cyber-physical world), in this exemplary embodiment, at procedure 215, the sender can be enabled to create an augmented message, which can include the sender's own public key, the receiver's public-key, message signal, hash of message signal concatenated with private data (e.g., type and private key) and time-stamp, further encrypted by the sender's private signing key. At procedure 220, the sender can be enabled to send the encrypted augmented message to the receiver. At procedure 225, the receiver can be enabled to check the message for a suitable set of local and global properties: for example, if the message can have in fact been sent by the sender as claimed. If the receiver's checking process succeeds, the receiver can carry out a suitable action, based on the message and the result of the checking procedure. For example, the sender and receiver can receive certain utilities, and the resulting utilities can be estimated by a known procedure (e.g., a procedure that is known to both the sender and the receiver). At procedure 230, the utilities received by the sender as well as by the receiver can be calculated. At procedure 235, a group of checkers (e.g., designated agents in the cyber-physical system other than the sender and the receiver) can be enabled to record the transactions by storing the signal transmission, checking results and utility information in a publicly visible hyper-ledger.

A SG can be specified in a formal language Signaling Game Specification Language ("SGSL"), which can specify how two agents with public/private key identities take on the roles of sender and receiver, while their strategies range over known set of TYPE's and ACTION's. SGSL-specified description uses their states utilities to devise a set of SIGNAL alphabets that can be used in defining the communication protocols and messages. Such a protocol design can be accomplished using an exemplary compiler-compiler such as YACC (e.g., yet another compiler compiler). The specifications of a signaling game can also be amenable to other forms of program verification using formal methods.

Examples of SG's that can be specified in SGSL can include: PAYMENT GAME, BUYER-SUPPLIER GAME, CLINICAL TRIAL GAME, etc., which can specify:
  (i) how a sender with a private electronic wallet can pay a receiver certain amounts of digital cash (e.g., without deceiving by repudiation or double-spending), (ii) how a buyer of a service accepts a supplier's bid consisting of (e.g., investment, deadline and confidence of success) without being deceived by dishonest over or under-bidding coupled with incompetence or fraud, or
  (ii) how a patient enrolls in a clinical trial conducted by a pharmaceutical company without violating privacy and informed consent requirements, etc. respectively.

In an exemplary embodiment, an automated computer procedure can be used to generate low-level code to enable a sender to send a signal to a receiver according to the protocols supported by the exemplary embodiment.

Additional, non-strategic, agents can also be specified in the SGSL. An agent can be non-strategic, if it can have no utility of its own, but can carry out a specific action, or can send a specific signal if and only if certain properties can be satisfied by the signal and signaling agent; it can utilize certain transaction fees to be paid for the service. While checkers for the hyper-ledger can be one such class of agents there can be two other classes of agents: (i) recommenders and (ii) verifiers. Recommenders can recommend a profitable signal for the senders to send, while verifiers can inform a receiver what action can be taken safely. The transactions carried with verifiers and recommenders can be recorded in the hyper-ledger.

Figure 3:
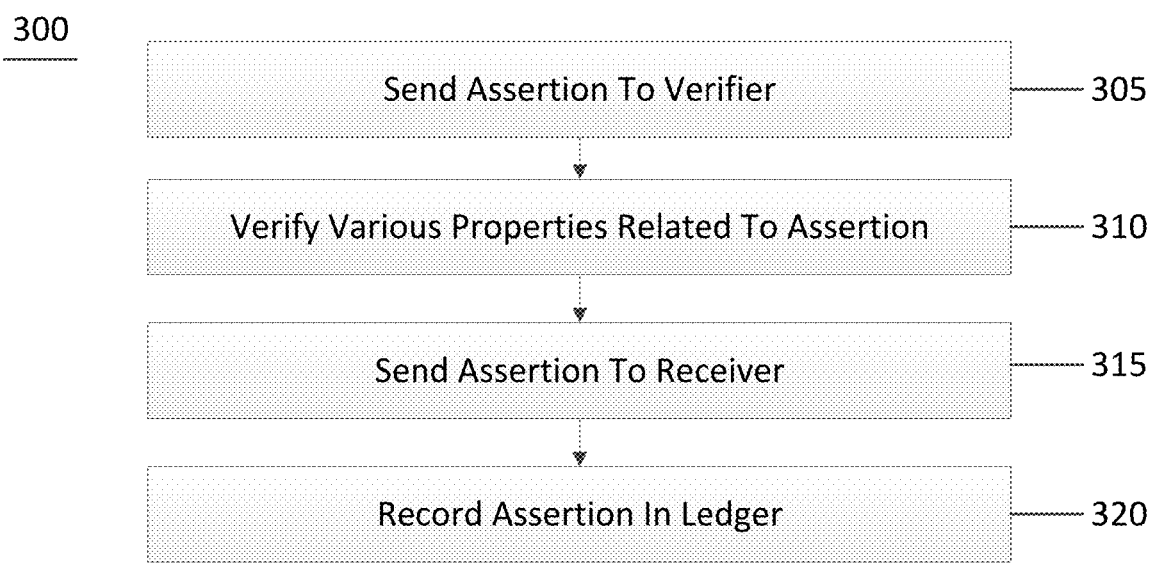
FIG. 3 is an exemplary flow diagram of an exemplary method for performing a Signaling Game Specification Language transaction according to an exemplary embodiment of the present disclosure.

FIG. 3 shows an exemplary flow diagram of an exemplary method 300 for performing a Signaling Game Specification Language transaction according to an exemplary embodiment of the present disclosure. For example, at procedure 305, an "assertion," can be sent to a verifier. At procedure 310, the verifier can check various properties related to the assertion and asserts that it can be safe to record it in the hyper-ledger. At procedure 315, the assertion can be sent or transmitted to the receiver. In various exemplary embodiments of the present disclosure, the receiver can also be the verifier. An exemplary assertion can be a Boolean proposition describing the sender's identity. Assertions recorded in the hyper-ledger can be combined (e.g., as Boolean formulas) to create new assertions, which can be checked for satisfiability using a powerful SAT-solver. Such new assertions can also be recorded in the hyper-ledgers in a manner similar to the process described above. The assertions can contain encrypted sub-assertions, which can be checked using a suitable Fully Homomorphic Encryption ("FHE") procedure, but without the verifier being able to decrypt. At procedure 320, the assertion can be recorded in a ledger.

A group of checkers can be needed to perform proof-of-work (e.g., or proof-of-stake or proof-of-space) task to indicate costly signaling in order to be permitted to augment the hyper-ledger. The hyper-ledger can be in the form a chain, or a tree or a directed-acyclic-graph ("DAG"), and can have a semantics of a Kripke structure, where each block can have a state assigned with it, additionally labeled by suitable propositional or Boolean formula assertions. Thus, such a hyper-ledger, called a Kripke-Ledger can be used to model check an assertion in a propositional modal/temporal logic. The temporal logic can be linear-time or branching-time temporal logic. A checker or a verifier can receive a transaction fee, when it can succeed in costly signaling proof-of-work, or proof-of stake or proof-of-space, and can augment the Kripke-Ledger and/or verify using a model-checking procedure.

A checker can act as an intermediary and "cellularize" a subset of senders and receivers to form an entity, called a Cell, or a community; however, a checker, acting as such an intermediary, may not reveal the membership information about the selected sub-set forming a cell. A checker, in this role, can check the local (e.g., Boolean) and global (e.g., modal) properties for all signaling interactions among the senders and receivers in the cell/community, for which the checker can have the designated role. The local property may not be time dependent, and can be checkable using the state information associated with the transaction in the Kripke-Ledger. The local property can be expressible as a Boolean formula, an arithmetic/algebraic formula, or their combination. In some exemplary embodiment of the present disclosure, the global property can be time dependent and can be checkable by the information of transactions in the Kripke-Ledger. The global property can be expressed as a propositional modal/temporal formula and can be further bounded to a time-interval of a fixed size. The global property can be checkable by a symbolic model checking as a translated into a satisfiability formula. The symbolic model checker can use a SAT-solver or SMT (e.g., satisfiability modulo theory) system, known to a person having ordinary skills in the art.

The exemplary system, method, and computer accessible medium, according to an exemplary embodiment of the present disclosure, can verify both the local and global (e.g., bounded in time) properties for a Kripke-Ledger using symbolic model checking and by creating Boolean circuits, for instance presented a Boolean Decision Diagram ("BDD"). The correctness of the properties can be established by the checker/prover privately by evaluating the Boolean circuits. Any verifier (e.g., a member of the cell/community) can convince themselves of the correctness of the property-checking by a Boolean ZK (e.g., Zero Knowledge) SNARK (e.g., Succinct Non-Interactive Argument of Knowledge) without recomputing the Boolean circuit and hence without revealing any member-specific information. Such a scheme can be used to verify that the interactions among the agents have followed an agreed-upon protocol and contract. In case of a violation of the protocol, or contract, the agent(s) involved can be reprimanded, lose reputation or be expelled from the cell. The culprit agent can receive an explanation that can indicate which properties have been violated and a ZK SNARK proof of the model checker's computation of the properties.

A list of plurality of further recommender agents and a plurality of further verifier agents can be generated, as well as ranks for such agents. Such agents can analyze the information stored in the global Kripke-Ledger to predict safe actions or provide suggestions for signals, thus keeping the system both live and safe.

Exemplary Signaling Games and Deception

Exemplary Deception

To understand how these systems can avoid undesirable outcomes that arise in the form of deception, information-asymmetric signaling games can be used to unify many of the adversarial use cases under a single framework, in particular when adversarial actions can be viewed mathematically as rational (e.g., utility-optimizing agents possessing common knowledge of rationality).

An exemplary model of signaling games can include two players. They can be asymmetric in information and can be called S, sender (e.g., informed), and R, receiver (e.g., uninformed). A notion in this game can be that of type, a random variable whose support can be given by T (e.g., known to sender 5). Additionally, $\pi_T(\bullet)$ can be used to denote probability distribution over T as a prior belief of R about the sender's type. A round of game can proceed as follows: Player S learns $t \in T$; S sends to R a signal $s \in M$; and R takes an action $a \in A$. Their payoff/utility functions can be known and depend on the type, signal, and action. Thus, for example:

$$u^i: T \times M \times A \to \mathbb{R}: i \in \{S, R\}. \quad (1)$$

In this structure, the players' behavior strategies can be described by the following two sets of probability distributions: (1) $\mu(\bullet|t)$, $t \in T$, on M and (2) $\alpha(\bullet|s)$, $s \in M$, on A. For S, the sender strategy $\mu$ can be a probability distribution on signals given types; namely, $\mu(s|t)$ describes the probability that S with type t sends signal s. For R, the receiver strategy $\alpha$ can be a probability distribution on actions given signals; namely, $\alpha(a|s)$ describes the probability that R takes action a following signal s. A pair of strategies $\mu$ and $\alpha$ can be in Nash equilibrium if, and only if, they can be mutually best responses (e.g., if each maximizes the expected utility given the other). Accordingly, for example:

$$\sum_{t \in T, s \in M, a \in A} u^s(t, s, a) \pi_T(t) \mu^*(s|t) \alpha(a|s) \geq \quad (2)$$

$$\sum_{t \in T, s \in M, a \in A} u^s(t, s, a) \pi_T(t) \mu(s|t) \alpha(a|s)$$

-continued $$\sum_{t \in T, s \in M, a \in A} u^R(t, s, a)\pi_T(t)\mu(s \mid t)\alpha^*(a \mid s) \geq \quad (3)$$

$$\sum_{t \in T, s \in M, a \in A} u^R(t, s, a)\pi_T(t)\mu(s \mid t)\alpha(a \mid s)$$

for any $\mu$, $\alpha$. Such a strategy profile $(\beta^*, \mu^*)$ can exist. The exemplary models for sender-receiver utility functions can be based on functions that can combine information rates with distortion, as in rate distortion theory ("RDT"). For instance, assume that there can be certain natural connections between the types and actions, as modeled by the functions $f_S$ and $f_R$ for the sender and receiver respectively. Thus, for example:

$$f_S: T \to A; \quad f_R: A \to T. \quad (4)$$

Then the utility functions for each can include two weighted-additive terms, one measuring the mutual information with respect to the signals and the other measuring the undesirable distortion, where the weights can be suitably chosen Lagrange constants. Thus, for example:

$$u^S = I(T,M) - \lambda_S d^S(f_S(t), a), \&$$

$$u^R = I(A,M) - \lambda_R d^R(t, f_R(a)), \quad (5)$$

where I can denote information and $d^R$, $d^S$ can denote measures of distortion.

This definition can also capture the notion of deception as follows. Note that the distribution of signals received by R can be given by the probability distribution $\pi_M$, where, for example:

$$\pi_M(s) = \sum_{t \in T} \pi_T(t)\mu(s \mid t), \quad (6)$$

and the distribution of actions produced by R can be given by the probability distribution $\pi_A$, where, for example:

$$\pi_A(a) = \sum_{s \in M} \pi_M(s)\alpha(a \mid s). \quad (7)$$

$\pi_T$ and $\pi_A$ can be probability distributions on T and A respectively. If $\hat{\pi}_T$ can be the probability distribution on T induced by $\pi_A$ under the function $f_R$, then, for example:

$$\hat{\pi}_T(\cdot) := \pi_A(f_R^{-1}(\cdot)). \quad (8)$$

A selection of an exemplary measure for deception can be given by the relative entropy between the probability distributions $\pi_T$ and $\hat{\pi}_T$. Thus, for example:

$$\text{Deception} := Rel.Entropy(\hat{\pi}_T \mid \pi_T) = \sum_{t \in T} \hat{\pi}_T(t)\log_2 \frac{\hat{\pi}_T(t)}{\pi_T(t)}. \quad (9)$$

This exemplary definition can describe deception from the point of view of the receiver. To get the notion of deception from the point of view of the sender, several rounds of the game can be played. The equation can imply that deception can be both defined as the sending of misleading information, or the withholding of information, both in order to manipulate the receiver. The Shapley value describes the distribution of utility to different players in a game. In a signaling game where deception occurs, the value can be skewed towards the sender.

Exemplary DNA Based Identities

Figure 4:
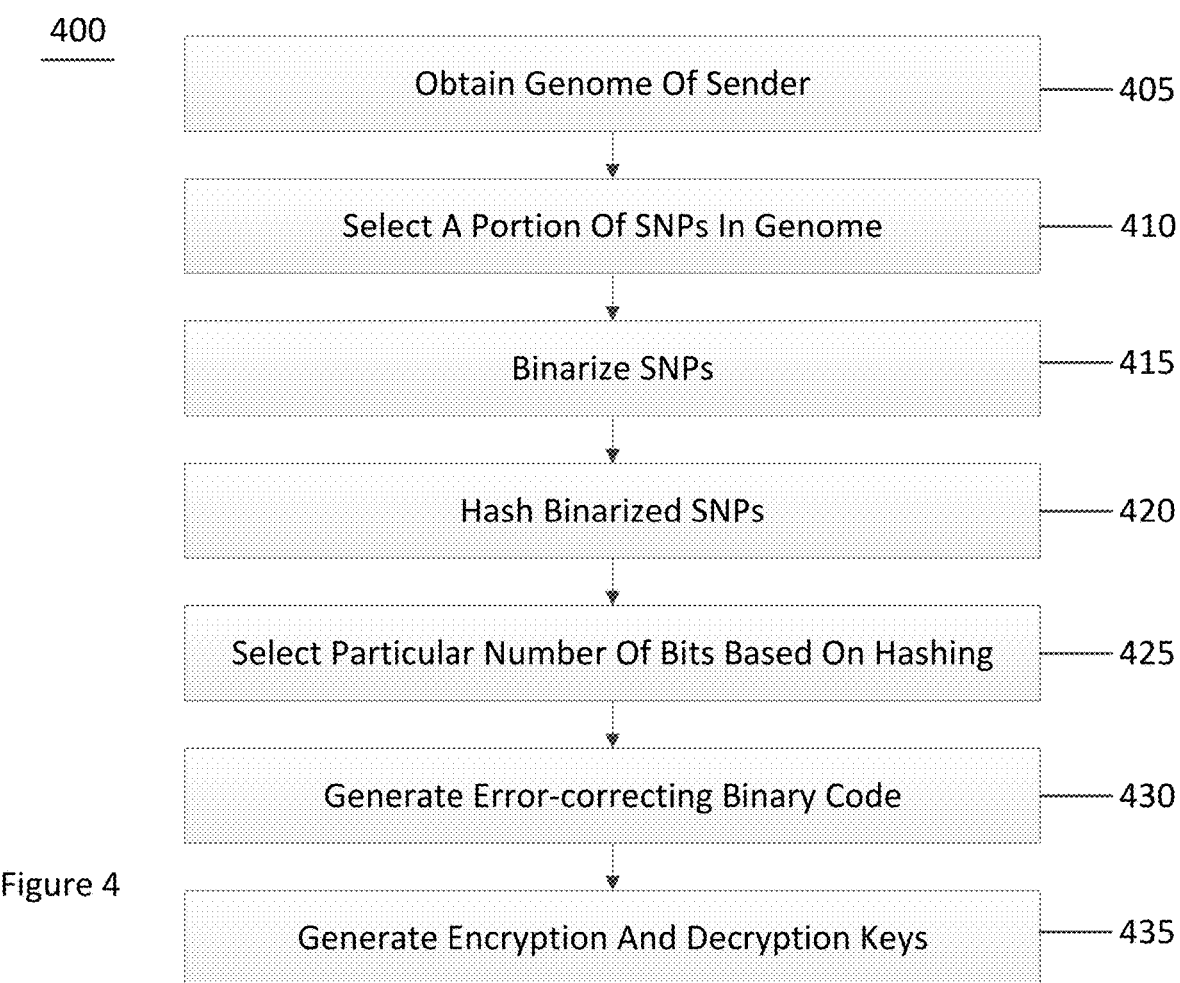
FIG. 4 is an exemplary flow diagram of an exemplary method for generating an encryption key and a decryption key according to an exemplary embodiment of the present disclosure.

FIG. 4 shows an exemplary flow diagram of an exemplary method 400 for generating an encryption key and a decryption key according to an exemplary embodiment of the present disclosure. For example, at procedure 405, the genome of an agent can be obtained using any suitable genetic sequence assembly procedure. For example, an agent can be a human and does not have an identical twin or one or more clones. The agent thus can have a genome, which would be $6 \times 10^9$ bps haplotypically, and can include many millions of SNPs. At procedure 410, a portion of the SNP's in the genome can be selected. It can be assumed that there can be at least a well-selected, about a million ($1 \times 10^6$) SNPs, which can be binarized, by mapping a homozygous SNP to a 0 and a heterozygous SNP to a 1 at procedure 415; the selection process can be so organized that the 0's and 1's can be roughly balanced for any individual in the human population. At procedure 420, a hashing (e.g., chosen from a fixed library) can be performed, and at procedure 425, about a 100 bits can be selected and augmented with another 100 random bits. Thus, for example:

$$c_0, c_1, \ldots, c_{99}, c_{100}, c_{101}, \ldots, c_{199}.$$

Further, e.g., $c_0 = 1$, otherwise, the bits can be "flipped." Consider a monic univariate polynomial generated from this in $Z_2[x]$. Thus, for example:

$$g(x) = c_0 + c_1 x + \ldots + c_{199} x^{199},$$

which can be irreducible (e.g., if no another attempt is to be made).

Using the polynomial g(x), an error-correcting binary Goppa code C can be generated at procedure 430. This code can include an efficient decoding procedure, and can generate a k×n generator matrix G. A sender/receiver agent can select a random k×k binary nonsingular matrix S and another random n×n permutation matrix P. The agent X can then compute $VR_x = SPG$ and $SG_x = (S, G, P)$ (e.g., generate encryption and decryption keys) at procedure 435, and can public and private McEliece Crypto keys, respectively, can be used.

For example, agent X can register his or her biometrics B with a verifier V (e.g., with public key $VR_V$ and private key $SG_V$—not necessarily based on genome, as V may not be a human) as follows: (i) X sends biometrics to V, as $VR_V(SG_X(B), B)$; (ii) V decodes it to obtain B and signs and encodes it as a $VR_X(SG_V(B), VR_X(B))$ and sends it to X; and (iii), X uses it to prove his identity by showing the biometrics (e.g., fingerprint) and a verified-signed copy of B: $SG_V(B)$.

In the exemplary case of an identity theft, agent X can prove his identity by showing that only his DNA sequence with the proper hash function can have generated the first hundred coefficients of the polynomial g(x), and thus the generator matrix G and the keys using suitable matrices S and P.

Exemplary Cellularization, Kripke-Ledger, Model Checking and ZK

The communication protocol is described as below. They can include

S=Sender (e.g., Informed) ↦ R=Receiver (e.g., Uninformed)

The game can reach a Nash equilibrium that can permit deception, but in this procedure, it can be tamed by Checkers. The checkers can verify:

Local (e.g., Propositional Logic Properties) [using CRYPTO]
Global (e.g., Modal Logic Properties) [KRIPKE-LEDGER]

The exemplary system can use asymmetric cryptography, the examples of which are described herein:
Public/Verification Key: $VR_S$ and $VR_R$
Private/Signature Key: $SG_S$ and $SG_R$
Keys can be linked via COMPUTATIONALLY-ONE-WAY-FUNCTIONS: for example, a McEliece procedure.

Exemplary Game Protocols 1

Figure 5:
FIG. 5 is an exemplary flow diagram of an exemplary game protocol according to an exemplary embodiment of the present disclosure.

FIG. 5 shows an exemplary flow diagram of an exemplary game protocol 500 according to an exemplary embodiment of the present disclosure. The exemplary methodology can be as follows:
1. At procedure 505, S generates $SG_S$ and $VR_S$, and publishes only $VR_S$.
2. At procedure 510, S detects (i) type/state $t \in T$, (ii) message $m \in M$ and (iii) a time stamp $\tau$.
3. At procedure 515, S sends an augmented message $$C \equiv (VR_S, VR_R, m, \#\langle t, m \rangle, \tau) \|_{SG_S}$$

Exemplary Game Protocols 2
1. At procedure 520, R ensures that S sent the message $C\|_{VR_S} \mapsto VR_S, VR_R$, etc.
2. At procedure 525, check Local properties . . . e.g., m can be consistent with t: $F(t,m)$.
3. At procedure 530, check Global properties [using model checking and ZK SNARKs] . . . for example, $t_1$, $t_2$, . . . satisfy some modal properties: $G(t,m)$.
4. At procedure 535, R performs an action a consistent with m:
S gets utility $U_S(t, m, a)$
R gets utility $U_R(t, m, a)$ Exemplary Game Protocols 3
1. To check the global properties and to be strategic, the players need access to the records of t's, $\#\langle t, m \rangle$'s and $U_{S,R}(t, m, a)$'s over time.
2. KRIPKE-LEDGER can be generated a distributed database that can maintain a continuously growing list of data records hardened against tampering and revision.
3. The exemplary KRIPKE-LEDGER can be maintained by MINERS who can be subject to costly-signaling via proof-of-work or proof-of-space related to certain intractable computational problems.

SPVs, Coalitions and Intermediaries
1. An intermediary can be interested in only a particular group of players (e.g., senders and receivers).
2. The intermediary must not reveal membership information.
3. The intermediary checks certain local and global properties about the players and publishes the results.
4. The intermediary convinces a member that he can be truthful. (e.g., using zk-SNARK's for Propositional Modal Logic).
5. Corollary: The players can make smart contracts with one another: Futures, Derivatives, Bonds subject to Positive and Negative Covenants, etc.

Exemplary Buyer-Supplier Game
1. The players have types: Info: Buyer or Supplier, Risk-Tolerance: High or Low, Signal: Bid-Level.
2. Matching can occur between two different types of players: one Buyer (e.g., Receiver) and the other Supplier (e.g., Sender) within the Risk-Tolerance bounds.
3. Sender player sends a proposal to a receiver player.
4. The intermediary checks that one can be Buyer and the other Supplier with right local constraints and Supplier can have sufficient reputation (e.g., no adverse selection) and can be participating in tolerable level of commitment to projects (e.g., no moral hazard)
5. The intermediary approves certain matched proposals.
6. The receiver can select to invest (e.g., after a courtship, etc.)
7. The intermediary can be able to prove that all the unapproved proposals can be justifiable.

This exemplary system can be described in Signaling Game Specification Language ("SGSL"), translated into a cyber-physical implementation, and can facilitate buyers and suppliers to be matched efficiently.

Exemplary Logic: Models and Model Checking

In logic, temporal logic refers to a system of rules and symbolism for representing, and reasoning about, propositions qualified relative to various "modes" of time (e.g., "I am always shopping," "I will eventually Uber to a shop," or "I will be shopping until I am dropping of exhaustion;" time can be treated in terms of its topology). Given a Kripke Structure model, there can be efficient decision processes to "check" if a certain temporal property (e.g., expressed in the logic) holds true. How can smart urban societies deploy dynamically emerging (e.g., social) contracts and their rigorous logical verification via data and technology recording interactions over time?

Thus, not only the relations—neither genetic (e.g., possibly, leading to nepotism) nor reciprocation-based trust (e.g., possibly, leading to tyranny and demagoguery)—can provide a good foundation for the establishment of a complex cosmopolitan urban society and the evolution of social contracts needed to glue together the strategic, shrewd and selfish members of a complex system. Such an evolving dynamic structure can introspect its inner working, and can understand the causes and effects in order to create robust and stable social contracts, constitutions and laws, which can be recommended, executed, recorded, and/or verified using the best technologies available to a smart urban society and its governing body.

The mathematical/logical underpinnings of Probabilistic Causation can be expressible in the logic below, which can also facilitate efficient model checking in general. Thus enumerating complex prima facie causes from data or probabilistic state transition models becomes feasible. Thus, starting with a discrete time Markov chain ("DTMC") can be a directed graph with a set of states, S, it can be endowed (e.g., via labeling functions) with the atomic propositions true within them.

It can then be possible to make the labeling probabilistic, so that it can express that with some non-negligible probability, one's (e.g., Athen's) "optimistic views of democracy" can be false and may not suffice to harmonize other neighboring cities (e.g., Sparta) into a better governance—thus, the "truthiness" of such a statement could have been used to avoid long and devastating wars. A city's laws, logic and λoγoς could create its cosmos, ordering it and giving it form and meaning!

The states of the underlying model (e.g., Kripke structure model) can be related pairwise by the transition probability. There can also be an initial state from which a path (e.g., trajectory) through the system can begin. Each state has at least one transition to itself or another state in S with a non-zero probability. A general framework for causality analysis can be provided by model checking procedures in Probabilistic Computational Tree Logic ("PCTL"). (See, e.g., Reference 9). Suppes' prima-facie causality can be formulated in PCTL, and an exemplary approach to testing contracts using Kripke-models and SBCN (e.g., with pairwise causality represented as edges in a graphical model), can be used. (See, e.g., References 4 and 7).

Definition Probabilistic Computational Tree Logic, PCTL are types of formulas that can be expressed in PCTL can be path formulas and state formulas. State formulas can express properties that can hold within a state, determined by how it can be labeled with certain atomic propositions, while path formulas refer to sequences of states along which a formula can hold. For example:

1. All atomic propositions can be state formulas.
2. If $f$ and g can be state formulas, so can be $\neg f$ and $f \wedge g$.
3. If $f$ and g can be state formulas, and t can be a nonnegative integer or $\infty$, then $fU^{\leq t}g$ can be a path formula.
4. If $f$ can be a path formula and $0 \leq p \leq 1$, then $[f]_{>p}$ can be a state formula.

The exemplary syntax and the logic can build on a propositional Boolean logic, although can also be extended with various exemplary modes: the operator can be the metric "until" operator: $fU^{\leq t}g$: here, use of "until" means that one formula $f$ can hold at every state along the path until a state where the second formula g can become true, which can happen in less than or equal to t time units. Probabilities can be added to these "until"-like path formulas to make state formulas.

For example, path quantifiers analogous to those in CTL can be defined by: $Af \equiv [f]_{\geq 1}$ [Inevitably $f$]; $Ef \equiv [f]_{>0}$ [Possibly $f$]; $Gf \equiv fU^{\leq \infty}$false [Globally $f$], and $Ff \equiv$true $U^{\leq \infty} f$ [Evenually $f$]. Formal semantics of the PCTL formula can be associated in a natural manner. The event $f$ "probabilistically causes" g, if $f$ can be temporally prior to g and $f$ raises the probability of g $$f \longmapsto_{\geq p}^{\leq t} g \Leftrightarrow AG[f \rightarrow F_{\geq p}^{\leq t}g],$$

for some suitable hyper-parameters p>0 (e.g., for probability raising) probability and t>0 duration (e.g., for temporal priority). Additional criteria (e.g., regularization) can then be needed to separate spurious causality from the genuine ones. SBCN can provide a vastly simplified, and yet practical, approach to causality, especially when explicit time may not be recorded in the data. For example, efficient procedures can ensure and/or facilitate that smart contracts in PCTL facilitate a future, thus keeping the city's activities alive, and to ascertain safe behavior in the past by model checking specifications in PCTL.

Exemplary Games: Signaling and Deception

Urban societies of the future can be structured around anonymous citizens interacting rationally (e.g., Dharma) and strategically (e.g., Karma) to improve their utilities, even though other individuals' "types," identity and personal information can be facilitated to remain private. Deceptive behavior in the cities could be rampant, and can be tamed. Safe house-holds in the city can protect the citizens by a "cellularization-process," which can include (e.g., in a cell) humans, pets and things associated by familial relations. Multi-cellular neighborhoods can emerge, experiment, persist and extinguish by "hastily formed networks," and more permanent Intra- and Internets—some explorable and some dark! Game theory—be it evolutionary, or epistemological—can provide a forum in which such dynamics can be reviewed and molded.

Game theory can include the study of the strategies followed by individuals, and organizations, in situations of conflict and cooperation. A Nash equilibrium can refer to a certain mixture of strategies where a unilateral change in strategy by one player may not bring any benefit to it. (See, e.g., Reference 2). Maynard Smith pioneered the use of game theory in evolutionary biology, developing the concept of the evolutionarily stable strategy ("ESS"). An ESS can be a form of Nash equilibrium in a population where a mutant with a variant strategy cannot successfully invade. Replicator dynamics addresses the dynamics of fitter players (which possess superior utility) that preferentially replicate within a population. A contribution in these types of evolutionary games was the recognition that there may be no need for epistemologically aware agents given that the players could be non-human Bots, which can use black box AIs, which are unable to consciously adopt strategies.

Signaling game theory is a branch of game theory that was developed concurrently in both economics and organismal evolutionary biology in the 1970s, and such theory includes the sending of signals, honest or deceptive, from a sender to a (e.g., possibly, many) receiver(s). (See, e.g., Reference 10). Information asymmetry occurs when the sender possesses information about its type that may not be available to the receiver. Thus, the sender can choose whether to reveal its true type to the receiver. In comparison to organismal evolutionary biology, cyber-physical evolution has made lesser use of concepts from game theory, but with a growing number of contributions (e.g., cyber security), for example. (See, e.g., Reference 6). In addition, microbial ecology has made use of evolutionary game theory to explain cooperative interactions where metabolites can be public goods shared between microbes. Not unlike in the Buddhist axialization (e.g., evolving a Samsara created by a deceptive Mara/Maya), one can build technologies founded upon signaling game theory that has great explanatory power for a range of social processes, by pinpointing the 'strategies' of humans and things in their interactions with other humans and things. Commonalities between signaling behavior at the device, organismal, human and social levels can be highlighted.

To understand whether, for example, in a city, smart or otherwise, undesirable outcomes can arise in the form of deception, the exemplary system, method, and computer-accessible medium, according to an exemplary embodiment of the present disclosure, can utilize information-asymmetric signaling games, which can be used to unify many of the adversarial use cases under a single framework. In particular, situations when adversarial actions can be viewed mathematically as rational (e.g., utility-optimizing agents possessing common knowledge of rationality can be analyzed). An exemplary model of signaling games can include two players (e.g., an Uber driver and a passenger). They can be asymmetric in information (e.g., driver may not be told passenger's destination until they agree to engage in a ride). For example, they can be called S, sender (e.g., informed passenger), and R, receiver (e.g., uninformed driver). A notion in this game can be that of type, a random variable whose support can be given by T (e.g., known to sender S). In addition, $\pi_T(\bullet)$ to denote probability distribution over T as a prior belief of R about the sender's type (e.g., an Uber driver can guess a possible destination based on the source and time of the journey). A round of game can proceed as follows:

Player S learns $t \in T$;
S sends to R a signal $s \in M$; and
R takes an action $a \in A$.

Their payoff/utility functions can be known, and can depend on the type, signal, and action, as shown above in Eq. (1).

Exemplary Institutions: Recommenders and Verifiers

Predictive learning systems (e.g., Machine Learning and Artificial Intelligence and Formal Methods) can play an important role in the urban societies of the future. The inferences obtained by these systems can manifest themselves in social networks induced by "trust" relations, where trust can be measured by a "correlation of encounter." In other words, if one selects to rationally (e.g., but, possibly, information asymmetrically) and strategically interact with another individual, how likely can it be to choose to interact with the same individual repeatedly—in other words how trustworthy can be the other individual thus encountered. There have been growing interest in distributed per-missionless and trustless systems supported by distributed ledgers (e.g., Kripke Structures) and non-strategic verifiers (e.g., miners with costly signaling supported by proof-of-work); the technology remains in its infancy. An exemplary machine learning procedure can be used to produce a system of "recommenders," and "verifiers,"—serving negative and positive aspects of aspirational and traditional values—said differently, the evolutionary (e.g., replicator) dynamics set forth by variations and selections. Recommenders and verifiers can be non-strategic, perform costly signaling to display trustworthiness and augment intelligence of the cities' humans and things, who can be nonetheless strategic; they thus, rationally optimize their individual utilities. Agents (e.g., humans and things) can "virtualize" themselves by selecting a tribe of suitable recommenders and verifiers, while maintaining their privacy and strengthening their trust relations; possible distributed procedures and policies, for this purpose, can be built upon adversarial bandits (e.g., with interpretations).

The Nash equilibria of these signaling games can fall into exemplary classes: (i) desirable separating equilibrium, albeit conventional or (ii) uninteresting pooling equilibrium [or combinations thereof, in partial pooling equilibrium]

Exemplary Separating Equilibrium:

Each type t sends a different signal Mt.

$$f^s:t \mapsto \alpha[M_t].$$

Exemplary Pooling Equilibrium: All types t Send a Single Signal s*

In order for the Internet to be later relevant to physical smart urban societies, it (e.g., hyper-visor on a cloud) can be aware of the observed (e.g., partially) data and meta-data involved in signaling on the Internet and the underlying inter-twined sender-receiver games. For example, highly relevant to the Internet's revenues and returns-on-investment can be signals involved in Google Search queries (e.g., with the users' state of ignorance remaining private), keywords (e.g., private to Google) and advertisement selected by auction in an Ad-exchange (e.g., private to product developers)—utilities respectively being: page relevance for the user, return on investment for the advertisers, and customer satisfaction and retention for the publishers. To tame deception in these systems, it is possible to control them by non-strategic Recommenders and Verifiers.

Recommenders ensure Liveness: $\forall_A \exists_T \exists_S U_S(T,M,A) \geq \theta^*$;

Verifiers ensure Safety: $\forall_T \exists_A \exists_R U_R(T,M,A) \geq \theta^*$.

thus acting as correlating devices helping the entire system to evolve towards good separating equilibria, albeit conventional.

The exemplary technologies can be built around various Cyber-physical Games important to urban societies: for example, Cellularization, Kripke-ledgers, model checking, and Zero Knowledge ("ZK"). In summary, following protocols can be devised to play a role to organize safe households in the cities.

It is possible to cellularize a subset of households to create a safe and secure ways of sharing data, files (e.g., books and music), computation and things (e.g., children's' toys) where families can get together for community and civic activities without leading to security problems or lack of fairness (e.g., tragedy of the commons). The exemplary process can begin with many households joining to create a hastily formed (e.g., ephemeral) network and can use Bare Metal as a Service; in other words, user (e.g., each household) gets a physical machine, can install (e.g., open source) firmware, hypervisor, OS, etc. All communications can be performed encrypted. It can require that providers controlling the network can only deny service, but not snoop. Furthermore, exemplary results of the computation can be hidden, and computation obfuscated (e.g., further incorporating Differential Privacy, Multi-Party Computing, Erasure Coding—data makes sense only when k out of n pieces come, etc.) The participants (e.g., humans and things) interact subject to enforceable smart contracts.

The exemplary system, method, and computer-accessible medium, according to an exemplary embodiment of the present disclosure, can organize a large number of users of a cyber-physical network (e.g., Internet or a cloud) by providing each user with an identity, associated with their DNA, clusters them into cells/community by a process called cellularization, which can be governed by an intermediary called a checker, and can facilitate them to interact with each other in terms of a specified set of rules structured as an information asymmetric SG. A signaling game can facilitate an agent (e.g., called a sender) to send a signal (e.g., without revealing private data, called type) to another agent (e.g., called a receiver), who can carry out an action; the specific signaling game to be used in a community can be specified in SGSL and compiled into low-level code for use by the agents. The transactions over time can be recorded in a Kripke-ledger, and can be verified by the checker for certain agreed-upon temporal logic properties. Violation of certain properties can result in a penalty for the user involved; the faulty user can be provided with an explanation that can be guaranteed not to reveal any private information of the other users.

The exemplary system, method, and computer-accessible medium, according to an exemplary embodiment of the present disclosure, can facilitate data-flow between any two users (e.g., one called sender the other receiver), but does so, in a formal manner that can be determined by the signaling game structure, requirement of privacy (e.g., information asymmetry), and a need for pseudo-identity that can be resistant to theft and Sybil attacks. The exemplary results of the data flow can be recorded in a non-tamperable database that can be structured to facilitate efficient verification of complex properties without revealing private information. Such exemplary system can be used in payment system, smart contracts, coordinating buyer-supplier, clinical trial, job market interaction, etc. that can need to be constrained by HIPAA, FERPA or GDPR rules for privacy.

Figure 6A:
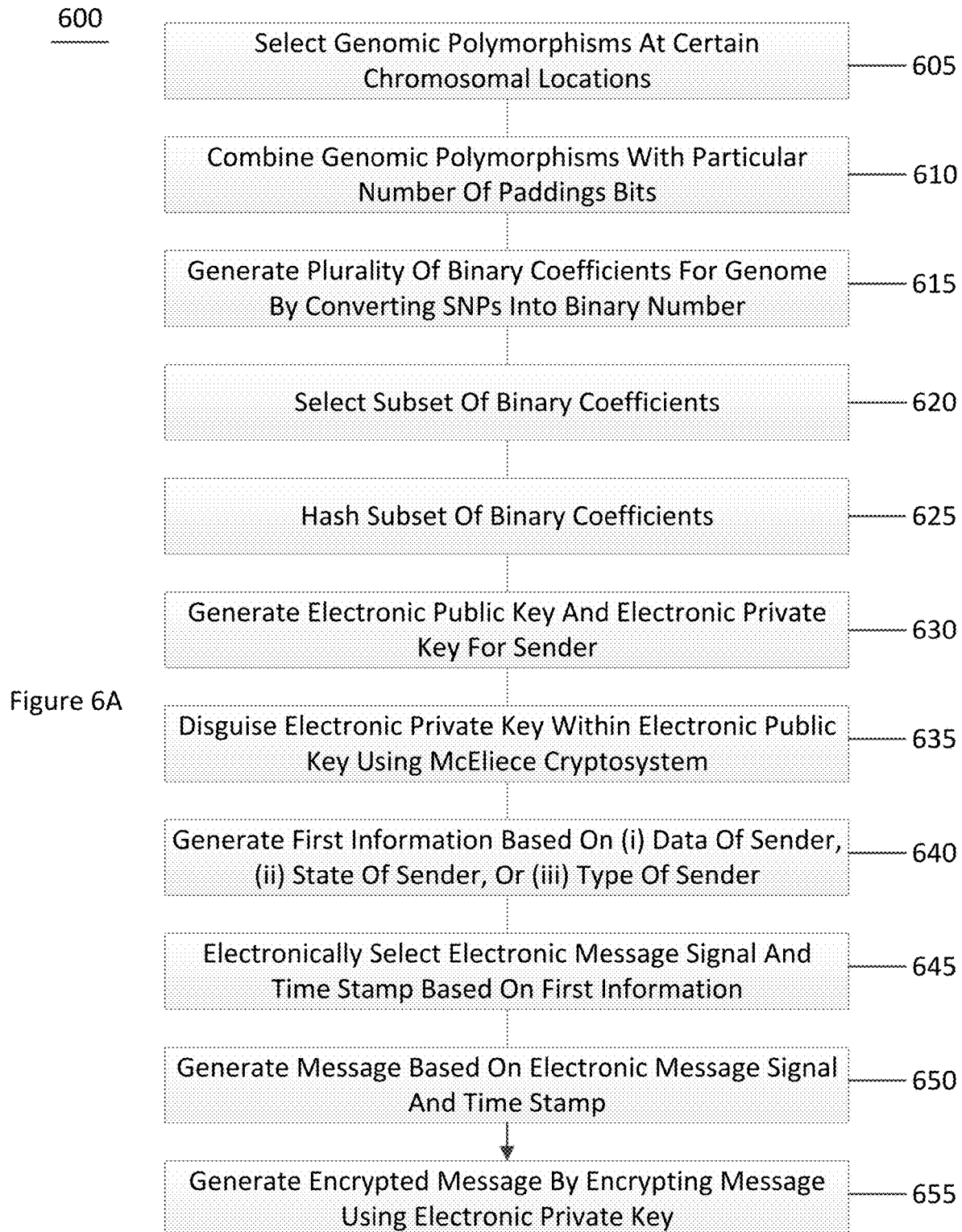
FIGS. 6A and 6B is an exemplary flow diagram of an exemplary method for transmitting or generating an encrypted message to or for a receiver from a sender according to an exemplary embodiment of the present disclosure.
Figure 6B:
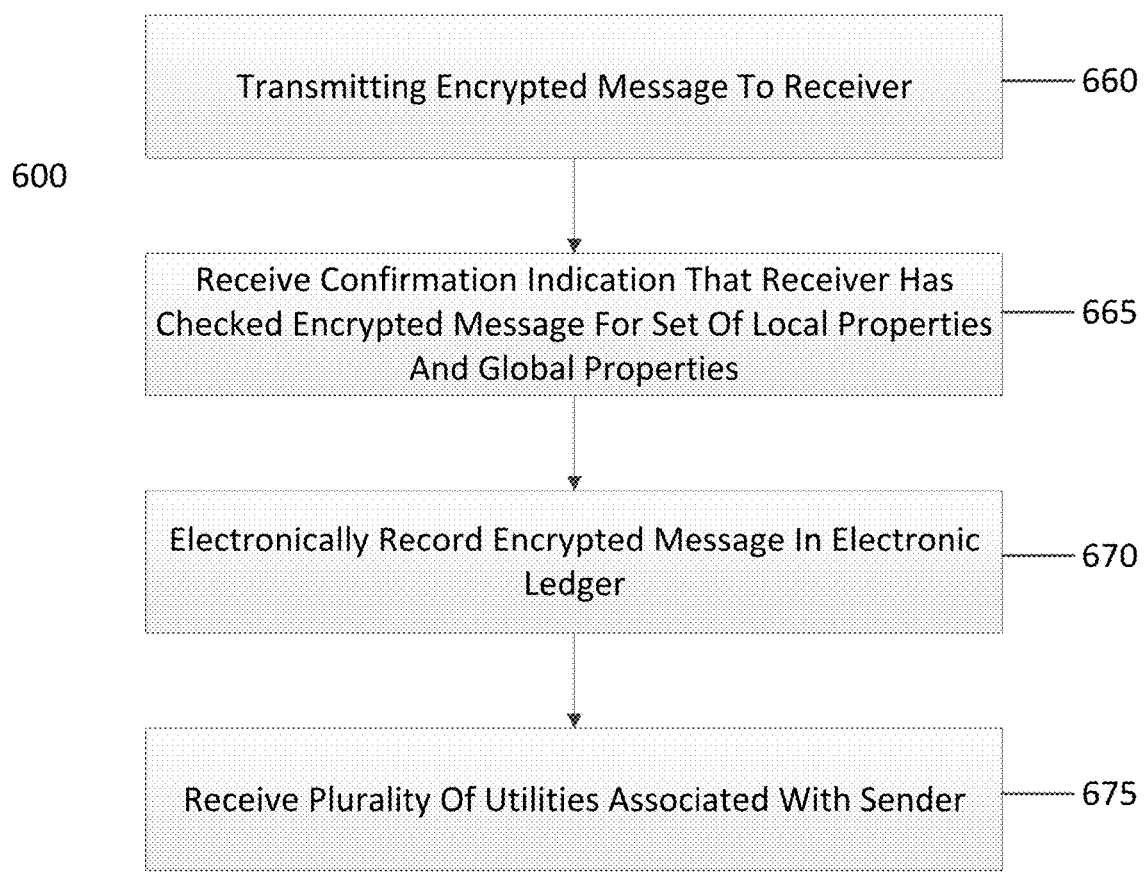

FIGS. 6A and 6B shows an exemplary flow diagram of an exemplary method 600 for transmitting or generating an encrypted message to or for a receiver from a sender according to an exemplary embodiment of the present disclosure. For example, at procedure 605, genomic polymorphisms, associated with the sender, can be selected at certain chromosomal locations. At procedure 610, the genomic polymorphisms can be combined with a particular number of paddings bits. At procedure 615, a plurality of binary coefficients for the genome can be generated by converting a single-nucleotide polymorphism into a binary number. At procedure 620, a subset of the binary coefficients can be selected. At procedure 625, the subset of the binary coefficients can be hashed. At procedure 630, an electronic public key and an electronic private key for sender can be generated. At procedure 635, the electronic private key can be disguised within the electronic public key using a McEliece cryptosystem. At procedure 640, first information based (i) data of the sender, (ii) a state of the sender, and/or (iii) a type of the sender can be generated. At procedure 645, an electronic message signal and a time stamp can be electronically based on the first information. At procedure 650, a message can be generated based on the electronic message signal and the time stamp. At procedure 655, the encrypted message can be generated by encrypting the message using the electronic private key. At procedure 660, the encrypted message can be transmitted to the receiver. At procedure 665, a confirmation indication that the receiver has checked the encrypted message for a set of local properties and global properties of the sender or the receiver can be received. At procedure 670, the encrypted message can be electronically recorded in an electronic ledger. At procedure 675, a plurality of utilities associated with the sender can be received.

Figure 7:
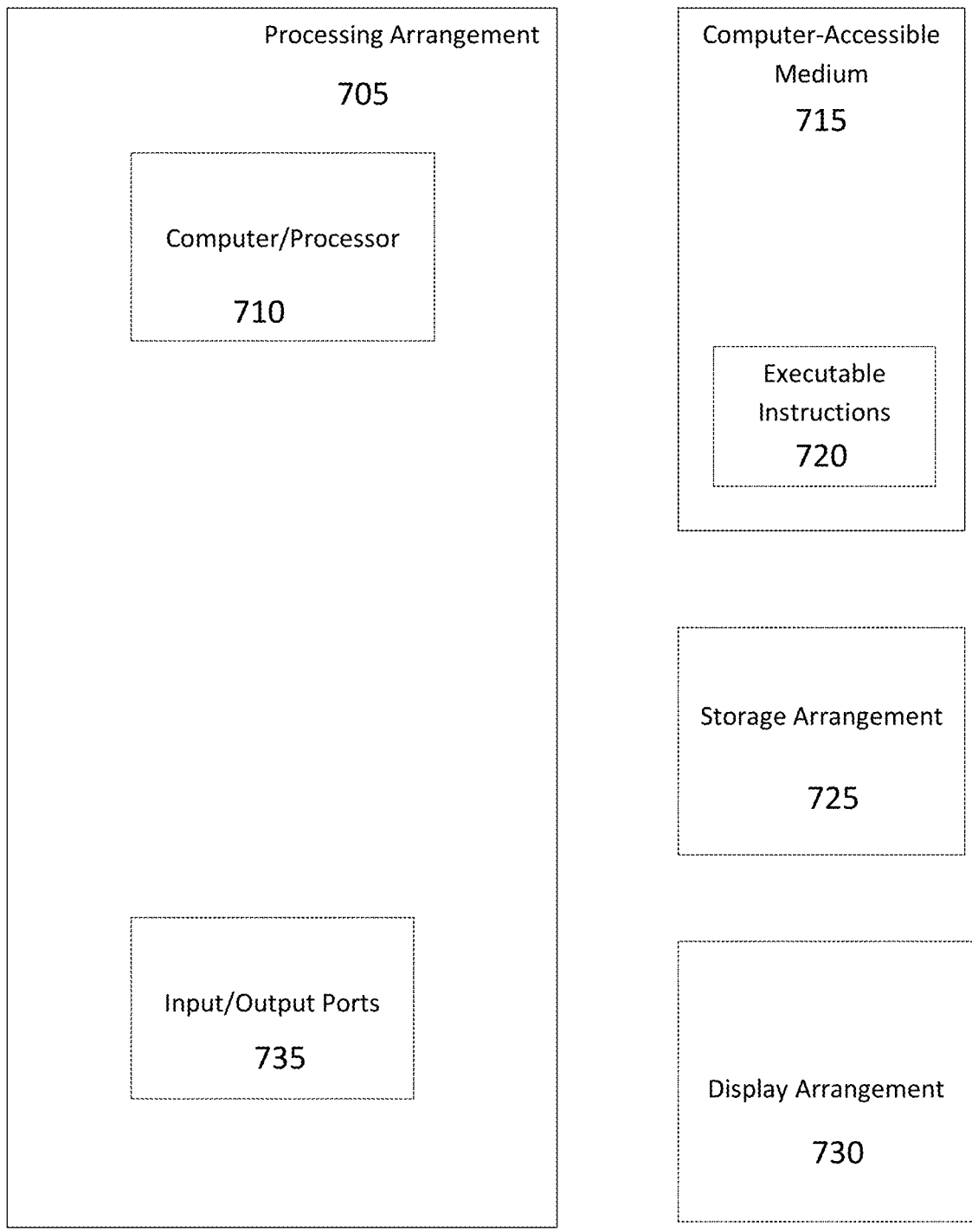
FIG. 7 is an illustration of an exemplary block diagram of an exemplary system in accordance with certain exemplary embodiments of the present disclosure.

FIG. 7 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 705. Such processing/computing arrangement 705 can be, for example entirely or a part of, or include, but not limited to, a computer/processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., as described herein above, a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 720 thereon. In addition or alternatively, a storage arrangement 725 can be provided separately from the computer-accessible medium 715, which can provide the instructions to the processing arrangement 705 so as to configure the processing arrangement to execute certain exemplary procedures, processes, and methods, as described herein above, for example.

Further, the exemplary processing arrangement 705 can be provided with or include an input/output ports 735, which can include, for example a wired network, a wireless network, the internet, an intranet, a data collection probe, a sensor, etc. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.
[1] Assmann, Aleida: Jaspers' Achsenzeit, oder Schwierigkeiten mit der Zentralperspek-tive in der Geschichte, in *Karl Jaspers: Denken zwischen Wissenschaft, Politik and Philosophie*, 187-205, (1989).
[2] Binmore, Ken, *Game Theory: A Very Short Introduction*, Oxford University Press, (2007).
[3] Black, Antony, The "Axial Period:" What Was It and What Does It Signify?, 70(12), 23-39, *The Review of Politics*, (2008).
[4] Bonchi, Francesco, Gullo, Francesco, Mishra, Bud and Ramazzotti, Daniele, Probabilistic Causal Analysis of Social Influence, *Proceedings of the 27th ACM International Conference on Information and Knowledge Management, CIKM* 2018, Torino, Italy, Oct. 22-26, 2018, 1003-1012, (2018).
[5] Byrom, T., *Dhammapada: The Sayings of the Buddha*, Shambhala pocket classics, (1993).
[6] Casey, William, Kellner, Ansgar, Memarmoshrefi, Parisa, Morales, Jose Andre and Mishra, Bud, Deception, Identity, and Security: the Game Theory of Sybil Attacks, *Commun. ACM*, 62(1), 85-93, (2019).
[7] Gao, Gelin, Mishra, Bud and Ramazzotti, Daniele, Causal Data Science for Financial Stress Testing, *J. Comput. Science*, 26, 294-304, (2018).
[8] Hoyer, Daniel and Reddish, Jenny, *Seshat History of the Axial Age*, (2019).
[9] Kleinberg, Samantha and Mishra, Bud, The Temporal Logic of Causal Structures, UAI 2009, Proceedings of the Twenty-Fifth Conference on Uncertainty in Artificial Intelligence, Montreal, QC, Canada, Jun. 18-21, 2009, 303-312, AUAI Press, (2009).
[10] Skyrms, Brian, *Signals: Evolution, Learning, and Information*, publisher=Oxford University Press, (2010).

What is claimed is:
1. A non-transitory computer-accessible medium having stored thereon computer-executable instructions for transmitting or generating at least one encrypted message to or for at least one receiver from at least one sender, wherein, when a computing arrangement executes the instructions, the computing arrangement is configured to perform procedures comprising:

generating at least one electronic public key and at least one electronic private key for the at least one sender based on at least one genome associated with the at least one sender;

generating first information based on at least one of (i) data of the at least one sender, (ii) at least one state of the at least one sender, or (iii) a type of the at least one sender;

electronically selecting at least one electronic message signal and at least one time stamp based on the first information;

generating at least one message based on the at least one electronic message signal and the at least one time stamp;

generating the at least one encrypted message by encrypting the at least one message using the at least one electronic private key; and transmitting the at least one encrypted message to the at least one receiver.

2. The computer-accessible medium of claim of claim 1, wherein the computer arrangement is configured to generate the at least one electronic public key and the at least one electronic private key using a deterministic procedure.

3. The computer-accessible medium of claim 2, wherein the computer arrangement is configured to utilize the deterministic procedure to:

select genomic polymorphisms, associated with the at least one sender, at certain chromosomal locations; and combine the genomic polymorphisms with a particular number of paddings bits.

4. The computer-accessible medium of claim 2, wherein the computer arrangement is further configured to:

generate a plurality of binary coefficients for the at least one genome by converting at least one single-nucleotide polymorphism into a binary number;

select a subset of the binary coefficients; and hash the subset of the binary coefficients.

5. The computer-accessible medium of claim 4, wherein the computer arrangement is configured to generate a binary vector having a length of about 100 or about 200 by hashing the subset of the binary coefficients.

6. The computer-accessible medium of claim 1, wherein the computer arrangement is further configured to disguise the at least one electronic private key within the at least one electronic public key using a McEliece cryptosystem.

7. The computer-accessible medium of claim 1, wherein the at least one message includes at least one of (i) the at least one electronic public key, (ii) at least one further electronic public key associated with the at least one receiver, or (iii) a hash of the at least one message signal concatenated with private data and the at least one time stamp.

8. The computer-accessible medium of claim 1, wherein the type includes at least one of (i) a digital wallet, (ii) a private-key, (iii) a pseudonymity, (iv) a reputation, (v) a criminal record, (vi) a net-worth, (vii) a credit-score, or (viii) a marital-status.

9. The computer-accessible medium of claim 1, wherein the computer arrangement is further configured to receive a confirmation indication that the at least one receiver has checked the at least one encrypted message for a set of local properties and global properties of at least one of the at least one sender or the at least one receiver.

10. The computer-accessible medium of claim 9, wherein:

the local properties include at least one of (i) a digital message digitally signed using a private key, (ii) an amount of a net worth that exceeds a first threshold, or (iii) an amount of a reputation that exceeds a second threshold, and the global properties include at least one of (i) at least one smart contract, (ii) a reputation score that has remained above a third threshold for a second amount of time, or (iv) a credit-worthiness score that has remained above a fourth threshold for a second period of time.

11. The computer-accessible medium of claim 9, wherein the local properties and the global properties are time dependent.

12. The computer-accessible medium of claim 9, wherein the local properties and the global properties are time independent.

13. The computer-accessible medium of claim 1, wherein the computer arrangement is further configured to electronically record the at least one encrypted message in at least one electronic ledger.

14. The computer-accessible medium of claim 13, wherein the at least one electronic ledger is a visible hyper-ledger.

15. The computer-accessible medium of claim 13, wherein the at least one electronic ledger is a Kripke ledger.

16. The computer-accessible medium of claim 1, wherein the computer arrangement is further configured to receive a plurality of utilities associated with the at least one sender.

17. The computer-accessible medium of claim 16, wherein the utilities include at least one of (i) a trust between the at least one sender and the at least one receiver, (ii) a reputation associated with the at least one sender or the at least one receiver, (iii) a monetary payment, (iv) a credit-score, or (v) a reputation score.

18. A system for transmitting or generating at least one encrypted message to or for at least one receiver from at least one sender, comprising:

a computer hardware arrangement configured to:

generate at least one electronic public key and at least one electronic private key for the at least one sender based on at least one genome associated with the at least one sender;

generate first information based on at least one of (i) data of the at least one sender, (ii) at least one state of the at least one sender, or (iii) a type of the at least one sender;

electronically select at least one electronic message signal and at least one time stamp based on the first information;

generate at least one message based on the at least one electronic message signal and the at least one time stamp;

generate the at least one encrypted message by encrypting the at least one message using the at least one electronic private key; and transmit the at least one encrypted message to the at least one receiver.

19. A method for transmitting or generating at least one encrypted message to or for at least one receiver from at least one sender, comprising:

generating at least one electronic public key and at least one electronic private key for the at least one sender based on at least one genome associated with the at least one sender;

generating first information based on at least one of (i) data of the at least one sender, (ii) at least one state of the at least one sender, or (iii) a type of the at least one sender;

electronically selecting at least one electronic message signal and at least one time stamp based on the first information;

generating at least one message based on the at least one electronic message signal and the at least one time stamp;

generating the at least one encrypted message by encrypting the at least one message using the at least one electronic private key; and using a computer arrangement, transmitting the at least one encrypted message to the at least one receiver.

* * * * *